Feb. 12, 1924. 1,483,858
G. G. HEPBURN
WATER FILTERING AND SOFTENING APPARATUS
Filed Aug. 20, 1923
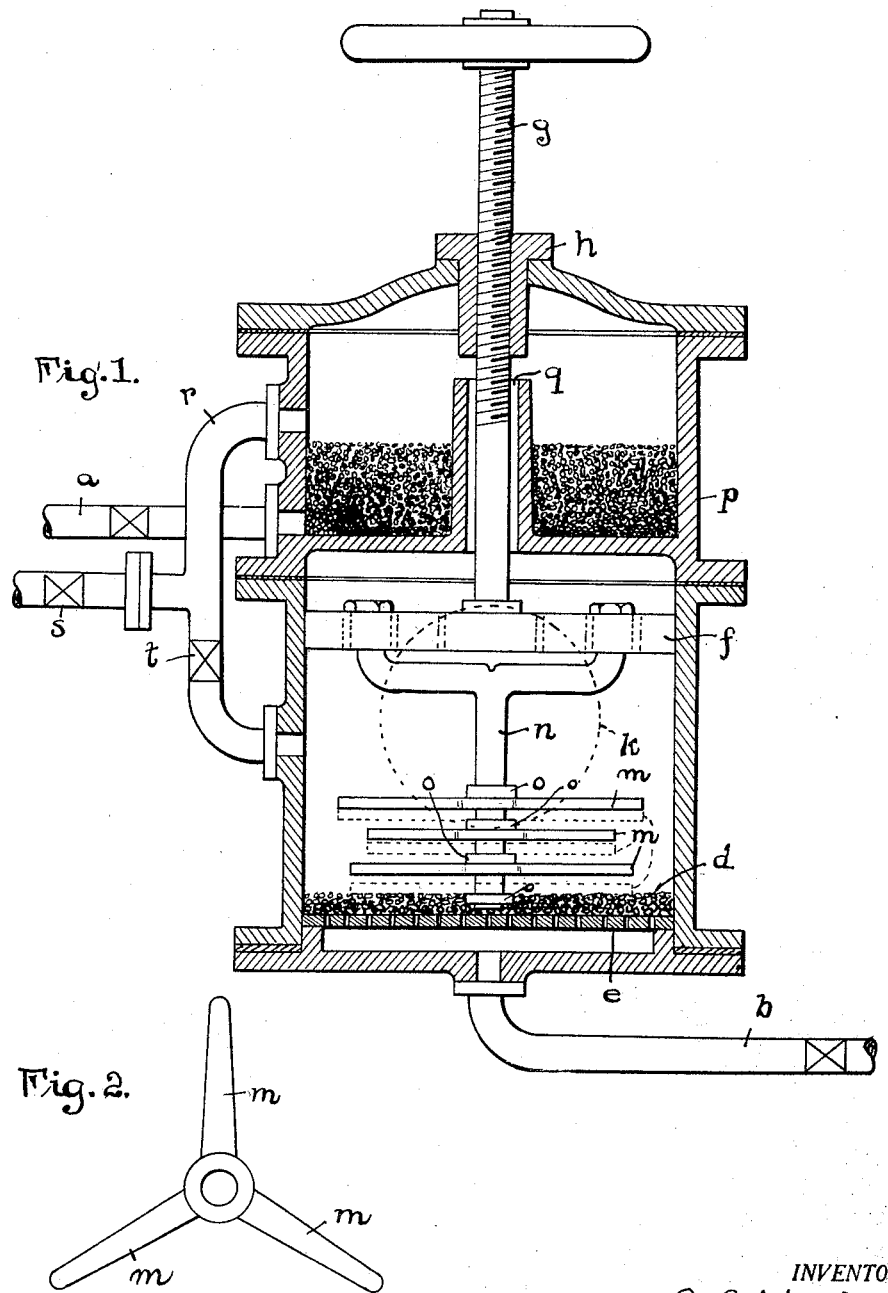
INVENTOR.
G.G. Hepburn
BY Marks & Clerk
ATTORNEYS.

Patented Feb. 12, 1924.

1,483,858

UNITED STATES PATENT OFFICE.

GEORGE GRANT HEPBURN, OF CHORLTON-CUM-HARDY, ENGLAND.

WATER FILTERING AND SOFTENING APPARATUS.

Application filed August 20, 1923. Serial No. 658,420.

*To all whom it may concern:*

Be it known that I, GEORGE GRANT HEPBURN, a subject of the King of Great Britain and Ireland, and resident of 52 Newport Road, Chorlton-cum-Hardy, Manchester, England, have invented certain new and useful Improvements in Water Filtering and Softening Apparatus, of which the following is a specification.

This invention relates to water softening processes and more particularly to apparatus employed for the filtering and softening of water by the process described and claimed in my prior U. S. Patent No. 1,426,638 dated Aug. 22, 1922 wherein peat is employed which after use for a time requires to have its water softening powers regenerated.

My invention comprises an apparatus for the filtering and softening of water in which the fibrous mass having the power of softening water is adapted to be subjected to a squeezing action by a hand or power press so as to remove excess of water therefrom prior to its treatment with the regenerative agent or agents and during washing, the mass being allowed to expand and to absorb water during the water filtering and softening process.

Referring to the accompanying drawing, Fig. 1 is a sectional view of the improved filtering apparatus, and, Fig. 2 is a plan view of one of the members for agitating or opening out the water filtering and softening material.

Referring to the drawing in detail, the water may enter the press at $a$ on the side near the top and a water outlet is provided at $b$. Within the press the peaty or fibrous mass (hereinafter called peat) may be supported between upper and lower perforated plates; wire gauze may be placed between the peat and the said plates. In the illustration, the peat is carried by a bed of quartz or other mechanical filtering material $d$ (supported on the perforated plate $e$) through which the water passes to the filter outlet connection. The upper perforated plate $f$ constitutes the pressure plate of a screw or other type of power or hand press. The spindle $g$ of the press passes through a threaded bush $h$.

The plate $f$ is connected with the upper bifurcated end of a shank $n$ having a plurality of spaced collars $o$ thereon between which latter are movably mounted a plurality of multi-arm members $m$. The collars $o$ on the shank $n$ are so spaced that when the plate $f$ is being raised, the uppermost member $m$ will be positively raised first and the remaining members raised in succession. It will be understood, after the peat has been compressed, the parts $m$ will all firmly engage the collars $o$ at their upper sides. The members $m$ serve, when the plate $f$ is raised, to open out or break up the peat which has been previously compressed and so facilitate the flow of water therethrough for softening purposes.

A manhole is provided at $k$ for the insertion and withdrawal of the fibrous mass.

A quartz or other filter bed may be provided at $p$. The water entering at $a$ passes first through the filter bed $p$, then through the annular passage $q$ to the filter bed beneath the pressure plate $f$.

It will be understood that filtration may take place either in an upward or in a downward direction as may be desired or as may be the more convenient. If in an upward direction $b$ becomes the water inlet and $a$ the water outlet.

The filter bed $p$ may be washed by allowing water to enter it at $a$ and leave by the pipe $r$. If the valve $s$ be open and the valve $t$ be shut, any matter in suspension in the wash water will pass to waste. If, however, $t$ be open and $s$ shut such matter which will be from the peat bed if the previous treatment has been effected by an upward filtration through the peat, will be returned to the latter.

In service, the peat, which may have been prepared in accordance with the process of my prior specification, is placed in the filter and is allowed to expand freely to the extent permitted by the plate $f$ whilst the water passes therethrough and is softened. When the softening powers of the peat are exhausted, the water flow therethrough is interrupted, the peat is compressed to reduce its bulk and expel water therefrom, and a solution of sodium chloride is passed into the peat to regenerate the softening properties thereof. The peat is then washed and opened out or broken up by the raising of the pressure plate and the members $m$. The supply of water is now restored and the softening action recommences.

It will be understood that the peat may be opened out by the members $m$ after being compressed and before the introduction of sodium chloride thereto for regenerating its water softening properties. Further, after treatment with sodium chloride the peat may be squeezed and then opened out before washing. After washing and before water softening commences, the peat may also be compressed by the plate $f$.

If desired, the regeneration may be effected by a continuous process, by passing salt solution slowly through the material in the press.

I may vary the details of my apparatus to suit any particular requirements.

I claim:—

1. In a filtering apparatus, a casing, a perforated support in said casing, a mechanical filtering material disposed on said perforated support, a peaty mass upon said mechanical filtering material, a perforated plate arranged upon said peaty mass, a shank depending from the perforated plate, a plurality of independently movable agitating members carried by said shank, and means for limiting the movement of the respective agitating members with relation to said shank.

2. A filtering apparatus as claimed in claim 1 characterized in that the means limiting the movement of the agitating members is so arranged as to cause the uppermost agitating member to be moved upwardly coincident with the upward movement of the shank and to cause the remaining agitating members to move upwardly in succession.

In testimony whereof I have signed my name to this specification.

GEORGE GRANT HEPBURN.